US006896282B1

(12) United States Patent
McKinley

(10) Patent No.: US 6,896,282 B1
(45) Date of Patent: May 24, 2005

(54) TOW HOOK REPLACEMENT HITCH

(76) Inventor: James B. McKinley, 640 Arapahoe Trail, Lake George, CO (US) 80827

( * ) Notice: Subject to any disclaimer, the term of this patent is extended or adjusted under 35 U.S.C. 154(b) by 77 days.

(21) Appl. No.: 10/758,383

(22) Filed: Jan. 16, 2004

(51) Int. Cl.$^7$ ................................................ B60D 1/00
(52) U.S. Cl. ................. 280/495; 280/416.1; 280/491.5
(58) Field of Search ............................ 280/416, 416.1, 280/491.5, 495

(56) References Cited

U.S. PATENT DOCUMENTS

| | | | | |
|---|---|---|---|---|
| 3,801,134 A | * | 4/1974 | Dees ....................... 280/416.1 |
| 4,280,713 A | | 7/1981 | Bruhn | |
| 4,676,413 A | * | 6/1987 | Began et al. ............... 224/532 |
| 4,746,138 A | | 5/1988 | James | |
| 5,078,418 A | * | 1/1992 | Kalmanson ................. 280/506 |
| 5,135,247 A | * | 8/1992 | Alfaro et al. ............ 280/415.1 |
| 5,431,425 A | | 7/1995 | Klinkman | |
| 5,476,279 A | | 12/1995 | Klemetsen | |
| D372,892 S | | 8/1996 | McCoy et al. | |
| 5,725,229 A | | 3/1998 | McWethy | |
| 5,735,539 A | * | 4/1998 | Kravitz ....................... 280/506 |
| 5,897,126 A | * | 4/1999 | Morris .................... 280/491.5 |
| 6,089,431 A | * | 7/2000 | Heyworth ................... 224/521 |
| 6,131,938 A | * | 10/2000 | Speer ......................... 280/506 |
| 6,474,522 B1 | * | 11/2002 | Johnson ...................... 224/515 |

* cited by examiner

Primary Examiner—Lesley D. Morris
Assistant Examiner—Paul Royal, Jr.

(57) ABSTRACT

A tow hook replacement hitch includes a mounting plate having a top side, a bottom side, a front end, a back end and a pair of lateral sides. The plate has a threaded aperture extending therethrough. The aperture extends through the top and bottom sides and is positioned generally adjacent to the back end. A mounting tube is attached to the top side of the plate such that the aperture is between the tube and the back end. The tube has an opening extending therethrough and through a pair of open ends of the tube. An axis of the opening is orientated perpendicular to the lateral sides. Threaded bolts may be extended through the opening and aperture and into a tow hook mount. A hitch receiving housing is attached to the bottom side of the plate such that the aperture is positioned between the housing and the back end.

9 Claims, 3 Drawing Sheets

TOW HOOK REPLACEMENT HITCH

BACKGROUND OF THE INVENTION

1. Field of the Invention

The present invention relates to hitch devices and more particularly pertains to a new hitch device for allowing the use of a tow hook mounting to be utilized for a trailer hitch connection.

2. Description of the Prior Art

The use of hitch devices is known in the prior art. U.S. Pat. No. 4,746,138 includes a design adapted for preventing vibration within a hitch apparatus. Another type of hitch device is U.S. Pat. No. 4,280,713 having a plate for mounting to the frame of a vehicle to supply the vehicle with a hitch connection. Yet another type of hitch device is U.S. Pat. No. 5,431,425 includes a retractable trailer hitch receiving apparatus for positioning on a vehicle.

While these devices fulfill their respective, particular objectives and requirements, the need remains for a device that allows a person to retrofit a trailer hitch to the tow hook mountings positioned on a front end of a vehicle. The tow hooks are designed for providing a position to which a cable may be attached to a vehicle which is stuck or otherwise incapacitated in order to move the vehicle. On such vehicles, such as four wheel drive vehicles supplied by General Motors, the tow hooks may be removed to expose usable mountings. These mountings may be used for attaching a trailer hitch thereto so that a person may moved a trailer forward of the vehicle

SUMMARY OF THE INVENTION

The present invention meets the needs presented above by generally comprising a mounting plate having a top side, a bottom side, a front end, a back end and a pair of lateral sides. The plate has a threaded aperture extending therethrough. The aperture extends through the top and bottom sides and is positioned generally adjacent to the back end. A threaded bolt may be extended through the aperture and into a tow hook mount. A mounting tube is attached to the top side of the plate such that the aperture is between the tube and the back end. The tube has an opening extending therethrough and through a pair of open ends of the tube. An axis of the opening is orientated perpendicular to the lateral sides. A threaded bolt may be extended through the opening and into the tow hook mount. A hitch receiving housing is attached to the bottom side of the plate such that the aperture is positioned between the housing and the back end.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
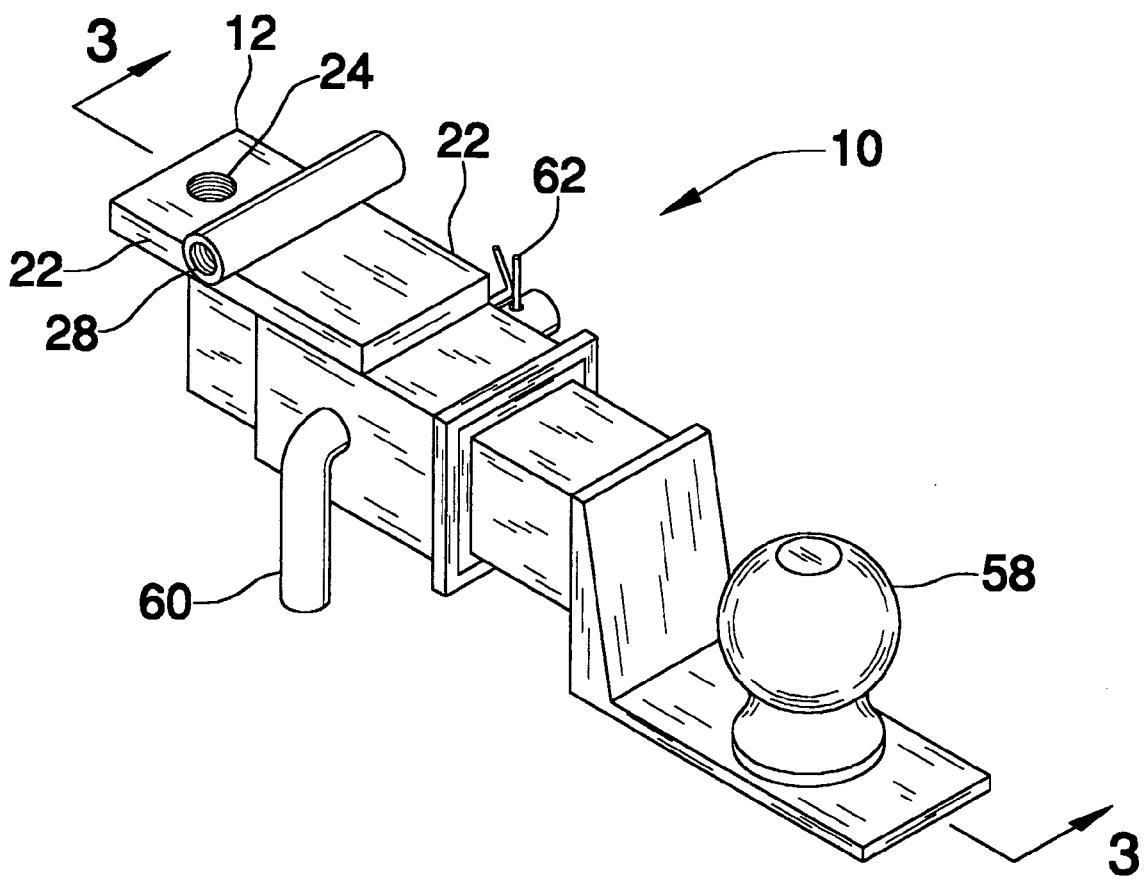
FIG. 1 is a perspective view of a tow hook replacement hitch according to the present invention.
Figure 2:
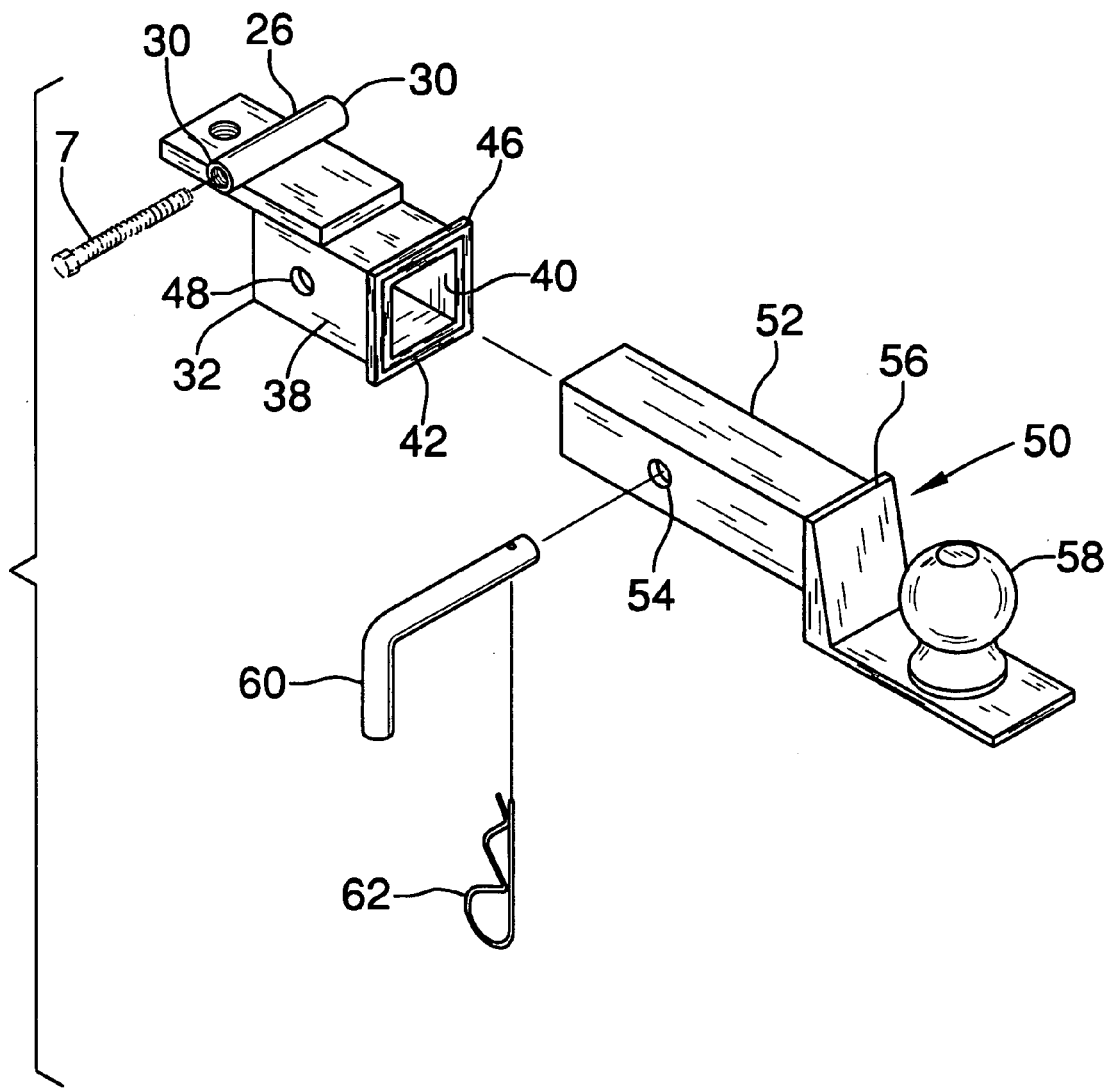
FIG. 2 is a perspective view of the present invention.
Figure 3:
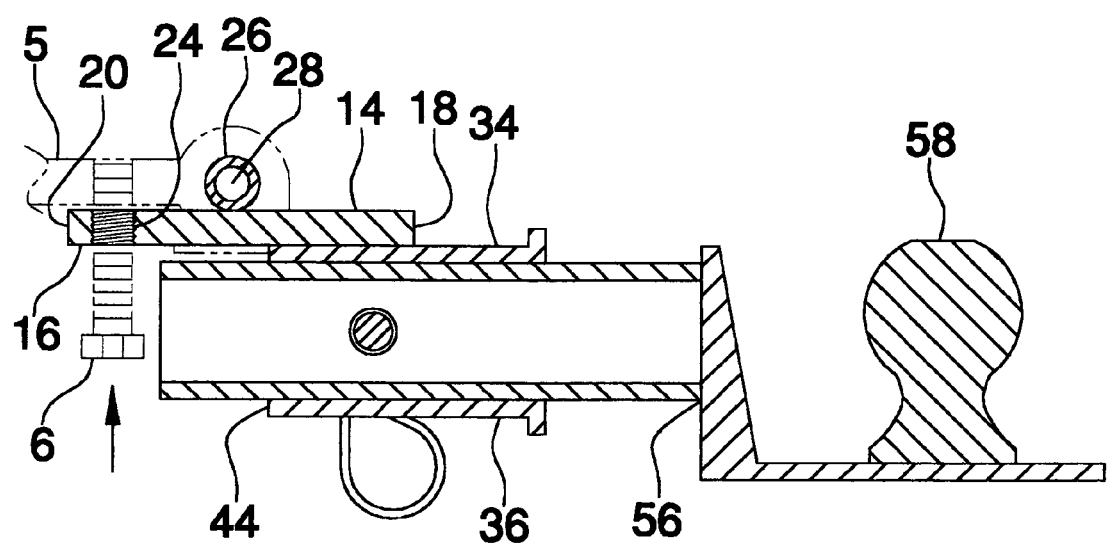
FIG. 3 is a cross-sectional view taken along line 3—3 of FIG. 1 of the present invention.

With reference now to the drawings, and in particular to FIGS. 1 through 3 thereof, a new hitch device embodying the principles and concepts of the present invention and generally designated by the reference numeral 10 will be described.

As best illustrated in FIGS. 1 through 3, the tow hook replacement hitch 10 generally comprises a mounting plate 12 that has a top side 14, a bottom side 16, a front end 18, a back end 20 and a pair of lateral sides 22. The plate 12 has a threaded aperture 24 extending therethrough. The aperture 24 extends through the top 14 and bottom 16 sides and is positioned generally adjacent to the back end 20. The plate 12 has a length from the back end 20 to the front end 18 generally between 5 inches and 6 inches, a width between the lateral sides 22 generally between 2 inches and 3 inches and a height substantially equal to 0.5 inches. A threaded bolt 6 may be extended through the aperture and into a tow hook mount 5 of a vehicle, and in particular, of a General Motors Corporation pick-up truck or sport utility vehicle.

A mounting tube 26 is attached to the top side 14 of the plate 12 such that the aperture 24 is between the tube 26 and the back end 20. The tube 26 has an opening 28 extending therethrough and through a pair of open ends 30 of the tube 26. An axis of the opening 28 is orientated perpendicular to the lateral sides 22. The tube 26 has a length between 2.5 inches and 4 inches and preferably extends beyond both of the lateral sides 22 of the plate 12. A distance between an axis of the opening 28 and line orientated perpendicular to the lateral sides and extending through an axis of the aperture 24 is between 1.50 inches and 1.75 inches and ideally equal to about 1.625 inches. The opening 28 is threaded and a threaded bolt 7 may be extended through the opening and into the tow hook mount 5.

A hitch receiving housing 32 is attached to the bottom side 16 of the plate 12 such that the aperture 24 is positioned between the housing 32 and the back end 20. The housing 32 extends forward of the plate 12. The housing 32 has a top wall 34, a bottom wall 36, a first side wall 38 and a second side wall 40 such that an open front side 42 and an open back side 44 are defined. An outwardly extending flange 46 is attached to and extends along a perimeter of the front side 42. Each of the first 38 and second 40 side walls has a bore 48 extending therethrough. The bores 48 are axially aligned with respect to each other.

A hitch member 50 is removably extendable into and attachable to the housing 32. The hitch member 50 includes a rod 52 that has a size and shape adapted for removably extending through the front side 42 and into the housing 32. The rod 52 is preferably rectangular shaped and has the same width and height as an interior of the housing 32. The rod 52 has a hole 54 extending therethrough. The hole 54 is alignable with the bores 48 such that an outer end 56 of the rod 52 extends away from the front side 42 of the housing 32. A ball hitch 58 is attached to the outer end 56 of the rod 52. A locking pin 60 is removably extendable through the bores 48 and the hole 54 for releasably securing the rod 52 to the hitch member to the housing 32. A latch pin 62 may be provided for extending through the locking pin 60 to retain the locking pin 60 in place.

In use, the mounting plate 12 and mounting tube 26 are attached to the bracket 5 remaining on the front end of a vehicle when the tow hooks are removed. This allows a hitch receiving housing 32 and corresponding hitch 50 to be attached to the front of the vehicle for finely tuned movements of a trailer forward of the vehicle in a manner that allows the driver of the vehicle to better view the movement of the trailer.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A towing hitch assembly for removably positioning on a tow hook mount, said assembly including:
    a mounting plate having a top side, a bottom side, a front end, a back end and a pair of lateral sides, said plate having a threaded aperture extending therethrough, said aperture extending through said top and bottom sides and being positioned generally adjacent to said back end, wherein a threaded bolt may be extended through the aperture and into the tow hook mount;
    a mounting tube being attached to said top side of said plate such that said aperture is between said tube and said back end, said tube having an opening extending therethrough and through a pair of open ends of said tube, an axis of said opening being orientated perpendicular to said lateral sides, wherein a threaded bolt may be extended through the opening and into the tow hook mount; and
    a hitch receiving housing being attached to said bottom side of said plate such that said aperture is positioned between said housing and said back end.

2. The assembly according to claim 1, wherein said plate has a length from said back end to said front end generally between 5 inches and 6 inches, a width between said lateral sides generally between 2 inches and 3 inches and a height substantially equal to 0.5 inches.

3. The assembly according to claim 1, wherein said tube has a length between 2.5 inches and 4 inches.

4. The assembly according to claim 1, wherein a distance between an axis of said opening and line orientated perpendicular to said lateral sides and extending through an axis of said aperture being between 1.50 inches and 1.75 inches.

5. The assembly according to claim 4, wherein said housing extends forward of said plate.

6. The assembly according to claim 5, wherein said housing has a top wall, a bottom wall, a first side wall and a second side wall such that an open front side and an open back side are defined, each of said first and second side walls having a bore extending therethrough, said bores being axially aligned with respect to each other.

7. The assembly according to claim 6, further including a hitch member being removably extendable into and attachable to said housing.

8. The assembly according to claim 7, wherein said hitch member includes a rod having a size and shape adapted for removably extending through said front side and into said housing, said rod having a hole extending therethrough, said hole being alignable with said bores such that an outer end of said rod extends away from said front side of said housing, a ball hitch being attached to said outer end of said rod, a locking pin being removably extendable through said bores and said hole for releasably securing said rod to said hitch member to said housing.

9. A towing hitch assembly for removably positioning on a tow hook mount, said assembly including:
    a mounting plate having a top side, a bottom side, a front end, a back end and a pair of lateral sides, said plate having a threaded aperture extending therethrough, said aperture extending through said top and bottom sides and being positioned generally adjacent to said back end, said plate having a length from said back end to said front end generally between 5 inches and 6 inches, a width between said lateral sides generally between 2 inches and 3 inches and a height substantially equal to 0.5 inches, wherein a threaded bolt may be extended through the aperture and into the tow hook mount;
    a mounting tube being attached to said top side of said plate such that said aperture is between said tube and said back end, said tube having an opening extending therethrough and through a pair of open ends of said tube, an axis of said opening being orientated perpendicular to said lateral sides, said tube having a length between 2.5 inches and 4 inches, a distance between an axis of said opening and line orientated perpendicular to said lateral sides and extending through an axis of said aperture being between 1.50 inches and 1.75 inches, said opening being threaded, wherein a threaded bolt may be extended through the opening and into the tow hook mount;
    a hitch receiving housing being attached to said bottom side of said plate such that said aperture is positioned between said housing and said back end, said housing extending forward of said plate, said housing having a top wall, a bottom wall, a first side wall and a second side wall such that an open front side and an open back side are defined, an outwardly extending flange being attached to and extending along a perimeter of said front side, each of said first and second side walls having a bore extending therethrough, said bores being axially aligned with respect to each other;
    a hitch member being removably extendable into and attachable to said housing, said hitch member including;
        a rod having a size and shape adapted for removably extending through said front side and into said housing, said rod having a hole extending therethrough, said hole being alignable with said bores such that an outer end of said rod extends away from said front side of said housing;
        a ball hitch being attached to said outer end of said rod; and
        a locking pin being removably extendable through said bores and said hole for releasably securing said rod to said hitch member to said housing.

* * * * *